Oct. 17, 1939.　　　　B. F. ANDERSON　　　　2,176,386
CHASSIS FOR AUTOMOTIVE VEHICLES
Filed Jan. 6, 1938　　　　3 Sheets-Sheet 1
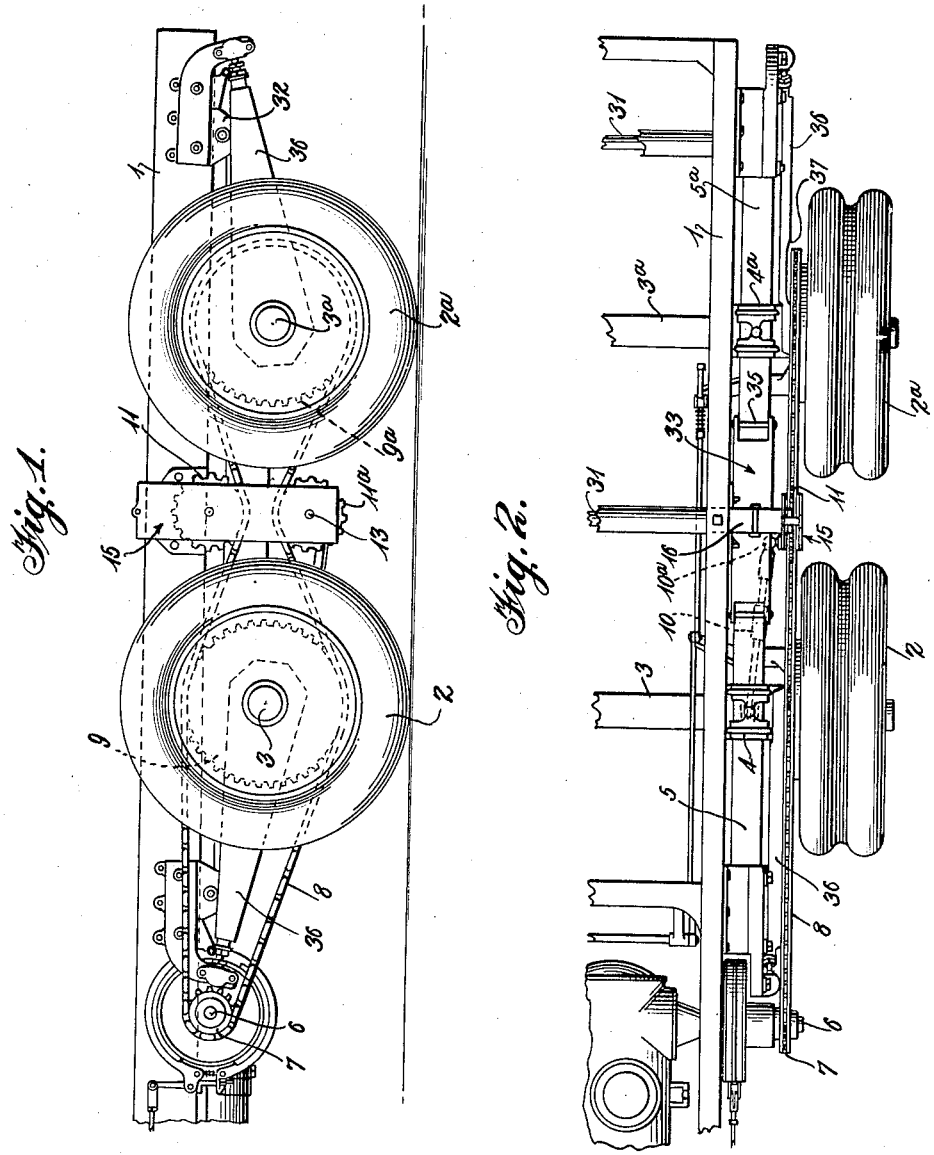
Inventor
Benjamin F. Anderson
By Richard K. Stevens
Attorney Oct. 17, 1939.  B. F. ANDERSON  2,176,386
CHASSIS FOR AUTOMOTIVE VEHICLES
Filed Jan. 6, 1938   3 Sheets-Sheet 2

Inventor
Benjamin F. Anderson
By Richard K. Stevens
Attorney

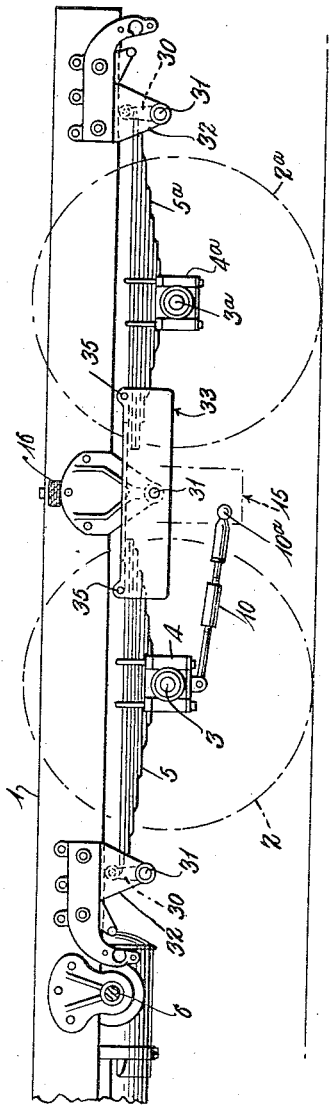

Patented Oct. 17, 1939

2,176,386

UNITED STATES PATENT OFFICE 2,176,386

CHASSIS FOR AUTOMOTIVE VEHICLES

Benjamin F. Anderson, Washington, D. C.

Application January 6, 1938, Serial No. 183,710

2 Claims. (Cl. 180—22)

This invention relates to automotive vehicles and more particularly to chassis for trucks of the class in which the wheels supporting the rear end of the chassis are mounted in tandem and operatively connected to a source of power for driving the vehicle.

An important object of my invention is to provide in a chassis of the above character a chain drive including an endless chain extending between a drive sprocket suitably provided upon the chassis and a plurality of driven sprockets, each associated with one of the driving wheels. According to the invention, the upper and lower runs of the chain are arranged to engage the teeth upon relatively short non-continuous segments of one or more of the driven sprockets, instead of winding around the sprockets through 180° in accordance with usual practice.

In the preferred form of the invention, the chain is provided with a suitable amount of slack, and means are arranged intermediate the driven sprockets for taking up the slack and drawing the chain into gripping engagement with the peripheries of the sprockets. By virtue of the invention, any suitable number of driving wheels of a vehicle may be driven through a single endless chain. Not only does this permit the use of a shorter length of chain than where, as in present practice, a separate chain is employed for connecting each pair of driven sprockets, but by avoiding duplication of sprockets upon the driving wheels, such wheels may be set closer to the chassis, which is particularly advantageous where dual wheels are employed, in order not to exceed the legal limit (usually 8 feet) prescribed in the majority of States as the maximum spread for trucks.

Another object of my invention is to provide a chain driven chassis of the above character which may be economically constructed from discarded or obsolete equipment such as is cheaply obtainable from automobile scrap yards or elsewhere. More particularly the invention resides in the provision of a chassis of the tandem wheel drive type constructed from a chassis of the single unit driving wheel type by adding a rear end portion, in reverse relation, taken from a chassis of the same model.

In consequence of the above mode of constructing a truck chassis, it has been necessary to develop a new type of spring suspension for the driving wheels carried by the respective sections of the combined chassis. The invention, therefore, has as a further aim to provide a spring suspension for the driving wheels including a pair of springs extending along each side of the chassis and each associated with one of the axles of the vehicle, the opposite ends of the springs being pivoted to the chassis while their adjacent free ends are connected by an equalizer box intermedially pivoted to the chassis.

Other objects and advantages will be apparent from the following detailed description of a preferred embodiment of my invention, reference being had to the annexed drawings, in which:

Figure 1 is a view in side elevation of the rear end portion of a truck chassis of the tandem wheel type showing associated therewith a chain drive for the driving wheels of the vehicle;

Figure 2 is a fragmentary plan view of the chassis of Fig. 1 showing only one side of the chassis;

Figure 6 is a view in side elevation of the rear end of the chassis corresponding to Fig. 1 but with the driving wheels omitted to show the spring suspension for the axles carrying the driving wheels;

Figure 7 is a detail perspective view of the equalizer box which bridges the opposed ends of the pair of springs upon opposite sides of the chassis, associated with the two axles;

Figure 8 is a schematic view of a type of truck chassis which lends itself to use in connection with the invention; and Figure 9 illustrates the manner in which a section of the truck chassis of Fig. 8 may be combined with a similar truck to form a chassis embodying the invention.

Figure 3:
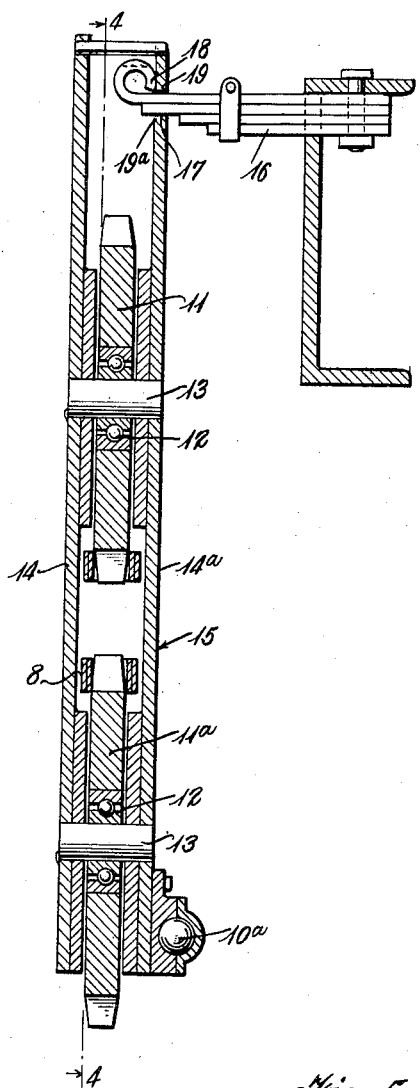
Figure 3 is a cross-sectional view through the idler box containing the sprockets for taking up slack in the chain.
Figure 4:
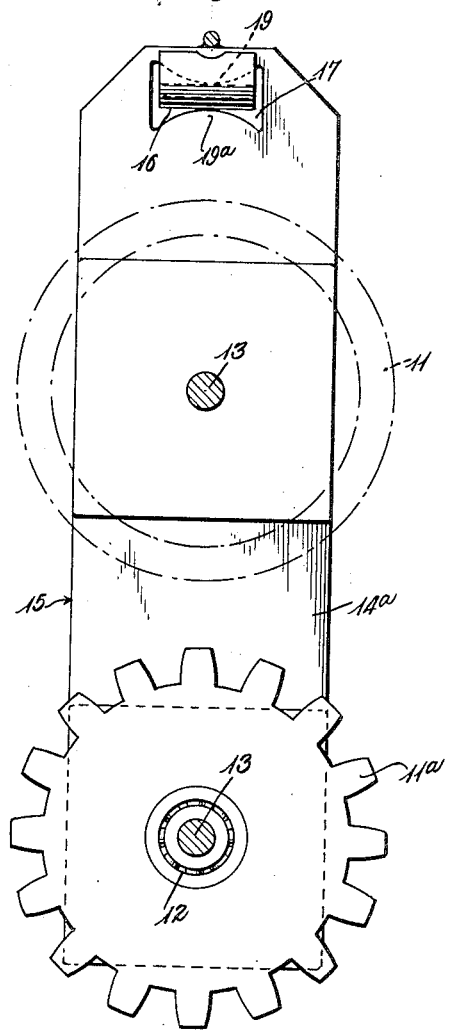
Figure 4 is a cross-sectional view through the idler box of Fig. 3, on the line 4—4 of that figure.

Referring to the embodiment of the invention represented in the drawings, Fig. 1 shows the rear portion of a truck chassis of the tandem driving wheel type. This chassis comprises a frame 1 supported at its rear end by a plurality of dual driving wheels 2 and 2a mounted upon parallel axles 3 and 3a. The axles are carried in bearings 4 and 4a fastened to leaf springs 5 and 5a, which latter are connected to the frame in a manner which later will be described.

For driving the wheels of the chassis there is provided a power shaft 6, connected with the usual automotive transmission (not shown), and rotatably supported within suitable bearings carried by the frame 1. Keyed upon each of the ends of this shaft, which extend beyond opposite sides of the frame, is a relatively small drive sprocket 7 around which winds a portion of an endless chain 8. This chain extends closely alongside the chassis and winds around a driven sprocket 9a connected to the rear driving wheel 2a so as to form a return bend of approximately 180°. The upper and lower runs of the chain engage opposite sides of a second driven sprocket 9 secured to the forward driving wheel 2 located intermediate the drive sprocket 7 and rear driving wheel 2a.

The chain is of sufficient length to provide slack which is taken up by a pair of idler sprockets 11 and 11a mounted, as best shown in Fig. 3, upon roller bearings 12 surrounding pins 13 extending between and fixedly supported within plates 14 and 14a, together constituting an idler box 15. By reason of this construction the chain is caused to hug the driven sprocket 9 along small arcs located upon approximately opposite sides of its circumference to insure positive driving engagement of the chain with the sprocket.

Figure 5:
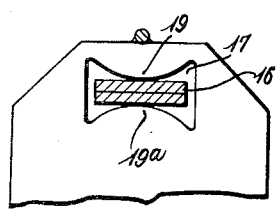
Figure 5 is a detail view of the upper end of the inner plate of the idler box showing the manner by which it is rockingly supported upon the frame of the chassis.

The idler box 15 is suspended from a laterally extending leaf spring 16 rigidly fastened at one end to the frame of the chassis while its flexible free outer end projects through an opening 17 in the plate 14a of the idler box and is rolled to form an abutment 18 engaging the inner face of the plate. As best shown in the detail view of Fig. 5, the opening 17 is so shaped to present rounded tongues 19 and 19a engaging the upper and lower faces, respectively, of the leaf spring and providing a fulcrum support for the idler box. A turnbuckle 10 welded at one end to the axle 3 and connected at its other end by a universal joint 10a to the lower end of the idler box 15 resists turning movement of the idler box under the urge of the chain. Sufficient play is afforded in the universal joint to permit of limited rocking movement of the idler box upon the tongue 19.

The chain drive just described for transmitting rotation from the power shaft 6 to the driving wheels, it will be understood, is duplicated upon the opposite side of the chassis.

One advantage of the chain driven chassis described above lies in its simplicity, economy and facility of manufacture. Such a chassis may be constructed, for example, by adding to a Mack truck model AC, as indicated in Fig. 8, and termed for convenience the primary chassis, the rear end portion of a similar model truck, termed the secondary chassis. Since the chassis of trucks ordinarily outlast their engines, truck chassis in good condition can usually be purchased cheaply at automobile scrap yards or repair shops. Thus, by cutting by means of an acetylene torch a section S from the rear end of the secondary truck chasses of the type shown in Fig. 8 along the planes indicated by dotted lines a and b, and by then reversing this section and welding it to the rear end of another chassis of the same model, the chassis shown in Fig. 9, adapted to be provided with the chain drive described above, results. The resulting composite truck is longer and, by reason of the additional pair of driving wheels, sturdier than the original truck and is ideally suited for use as a mounting for heavy machinery, such as excavating, dredging, hoisting and like equipment.

Opposite ends of each of the leaf springs 5 in the primary truck before its reconstruction are supported in links 30 pivoted to shafts 31 which in turn are mounted in brackets 32 on the frame, and extend crosswise of the frame. In cutting the section S from the secondary truck it will be seen that the cutting plane b falls slightly in advance of the bracket 32 which supports the rear end of the spring, thus severing the spring just forwardly of its rear end. At the time the reversed section S is united with the primary chassis the links 30 are removed from the bracket supporting the rear end of spring 5 of the primary truck and the end of this spring is likewise trimmed off. For flexibly connecting the adjacent truncated ends of the companion springs 5 and 5a there is an equalizer box 33, as best shown in Fig. 7, overlying and bridging the ends of the springs.

The equalizer box is of channel shape comprising spaced side walls 33a and a flat bearing plate 33b extending between the side walls. The equalizer box is disposed openside downward, and midway of its length the side walls are provided with aligned holes 34 adapted to receive the shaft 31 in bracket 32 which shaft originally served as a pivot for the links 30 supporting the rear end of the spring 5 before reconstruction of the primary chassis. The equalizer box is thus capable of pivotal movement under the unbalanced upward pressure of the ends of the springs against the bearing plate. The bearing plate is cut away adjacent opposite ends of the equalizer box, and pins 35 extending between and tying together the side walls provide rungs against which the ends of the springs bear when the equalizer box is tilted out of horizontal position.

Torque arms 36 of conventional construction are associated with each of the axles 3 and 3a of the reconstructed chassis, these torque arms providing means for shifting the axles for tightening the chains 8 on opposite sides of the vehicle. One such type of torque arm which lends itself to the chassis of the invention is described in the patent of Alfred F. Masury, granted June 27, 1916, to which reference is made for details of construction. These torque arms are preserved unchanged in the reconstructed chassis from the relationship they occupy in the primary and secondary chassis except for a reversal in position and the provision of an offset 37 in the torque arm included upon each side of the section S in order that this torque arm may clear the chain winding about sprocket 9a.

The operation of the chassis will be apparent from the foregoing description. Rotation is imparted to the power shaft 6, and consequently to the drive sprockets 7 fastened to the ends of the power shaft projecting out from opposite sides of the chassis frame 1. Through the endless chain 8 power will be communicated from each of the drive sprockets to the driven sprockets 9 and 9a connected respectively to the driving wheels 2 and 2a on each side of the vehicle. Sprocket 9a will be driven by the chain in the usual manner since it makes continuous engagement with this sprocket through approximately 180°, while driven sprocket 9 will be rotated by non-continuous engagement of the upper and lower runs of the chain with approximately diametrically arcuate portions upon this sprocket and by virtue of the idler sprockets 11 and 11a which retain the chain in hugging engagement therewith.

When traveling over uneven terrain the wheels are free to adjust themselves to the contour of the ground largely independently of the frame through pressure exerted by the juxtaposed ends of the springs upon the bearing plate 33b of the equalizer box 33, which latter is free to rock about the pivot pin 31. Thus, the chassis may travel over relatively rough ground but due to the articulated coupling of the springs and the stabilizing effect of the equalizer box upon the springs, no excessive amount of vertical motion will be transmitted to the frame.

Since only two endless chains located on opposite sides of the vehicle are employed, power will be transmitted to the driving wheels in a steady and uniform manner and the driving wheels will rotate in unison. Sudden jerks which tend to break the chains are avoided. Such jerks frequently occur in the usual type of chain drive where two sets of chains are employed, one set for connecting the forward driving wheels to the driving sprockets and the other set for connecting the rear driving wheels to the forward driving wheels, and resulting from the sudden taking up of slack in the rear chains after full power has been applied to the forward chains. As a consequence, in the chassis of the invention not only is the length of the chains required for transmission of power from the drive sprockets to the driven sprockets substantially shortened, but the liability to breakage of the chains is also reduced.

The invention may be embodied in other specific forms without departing from the spirit or essential characteristics of the invention, and the present embodiment is therefore to be considered as illustrative and not restrictive, and all changes which come within the meaning and range of equivalency of the claims are therefore intended to be embraced therein.

I claim:

1. In a chassis for automotive vehicles of the type having a frame, a pair of companion leaf springs mounted upon each of the opposite sides of the frame and extending longitudinally thereof adjacent its rear end, a plurality of axles fastened to the springs and mounted in parallel relation, driving wheels mounted on the axles, a drive sprocket forward of the said axles adapted to be rotated from a suitable source of power, a plurality of driven sprockets mounted rearwardly of the drive sprocket each operatively connected with one of the driving wheels, a single endless transmission chain winding around and extending between the drive sprocket and the rearmost driven sprocket, and engaging an intermediate driven sprocket, means coupling the distant ends of a pair of companion springs to the frame, the adjacent ends of said springs being free, an equalizer box overlying and flexibly connecting adjacent free ends of the companion springs and means pivotally connecting said equalizer box to the frame for rocking movement.

2. In a chassis for automotive vehicles of the type having a frame, a pair of companion leaf springs mounted upon each of the opposite sides of the frame and extending longitudinally thereof adjacent its rear end, a pair of axles fastened to the said springs and mounted in parallel relation, driving wheels mounted on the axles, a drive sprocket forward of the said axles adapted to be rotated from a suitable source of power, a pair of driven sprockets mounted rearwardly of the drive sprocket each operatively connected with one of the said driving wheels, a single endless transmission chain winding around and extending between the drive sprocket and the rearmost driven sprocket, and engaging an intermediate driven sprocket, means coupling the distant ends of each of said pairs of companion springs to the frame, the adjacent ends of said springs being free, an equalizer box overlying and flexibly connecting adjacent free ends of the companion springs, means pivotally connecting said equalizer box to the frame for rocking movement and a pair of idler sprockets rockably supported upon said chassis and engaging the said chain for taking up slack therein, said idler sprockets being located intermediate the driven sprockets and being of appreciably smaller diameter than said driven sprockets.

BENJAMIN F. ANDERSON.